United States Patent [19]

Suzuki et al.

[11] 3,900,486

[45] Aug. 19, 1975

[54] 3-METHYL-2-PHENYL-5-BENZOTHIAZOLINE ACETIC ACID COMPOUNDS AND PROCESS FOR PRODUCING THE SAME

[75] Inventors: Tadayuki Suzuki, Koshigaya; Jin Wada, Soka; Hiroki Miyamatsu; Shinji Ueno, both of Tokyo; Mitsuhiro Shimizu, Chiba, all of Japan

[73] Assignee: Tokyo Tanabe Company, Ltd., Japan

[22] Filed: Jan. 4, 1974

[21] Appl. No.: 430,915

[30] Foreign Application Priority Data

Jan. 23, 1973 Japan................................. 48-9158

[52] U.S. Cl.................................. 260/304; 424/270
[51] Int. Cl.²...................................... C07D 251/72
[58] Field of Search..................................... 260/304

[56] References Cited
UNITED STATES PATENTS
3,818,023  6/1974  Wada et al......................... 260/304

OTHER PUBLICATIONS
Elderfield (ed.), Heterocyclic Compounds, Vol. 5, John Wiley & Sons, 1957, pp. 677-678.

*Primary Examiner*—Richard J. Gallagher
*Attorney, Agent, or Firm*—McGlew and Tuttle

[57] ABSTRACT

3-Methyl-2-phenyl-5-benzothiazoline acetic acid and methyl ester thereof of this invention have the following structural formula:

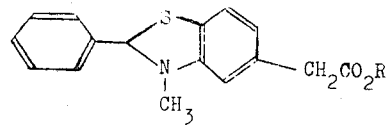

where R is hydrogen atom or methyl group. These new compounds may be synthesized by reduction of 5-carboxymethyl-3-methyl-2-phenylbenzothiazolium salt or of 5-methoxycarbonylmethyl-3-methyl-2-phenylbenzothiazolium salt, which salt compound may be prepared by methylation of 2-phenyl-5-benzothiazolyl acetic acid or methyl ester thereof, respectively. The compounds of this invention have markedly lower toxicological property and comparatively higher anti-inflammatory, analgesic and antipyretic activities compared with those of the previously disclosed benzothiazolyl acetic acid compounds.

3 Claims, No Drawings

3-METHYL-2-PHENYL-5-BENZOTHIAZOLINE ACETIC ACID COMPOUNDS AND PROCESS FOR PRODUCING THE SAME

The present invention relates to new benzothiazoline compounds. More particularly, it concerns with 3-methyl-2-phenyl-5-benzothiazoline acetic acid and methyl ester thereof.

3-Methyl-2-phenyl-5-benzothiazoline acetic acid and methyl ester thereof according to the present invention have the following structural formula:

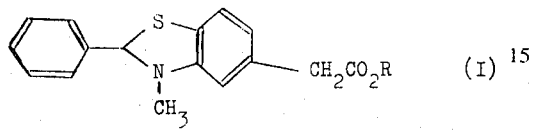

where R is hydrogen atom or methyl group.

The new compounds according to the present invention have useful pharmacological properties, possessing good analgesic activity, anti-inflammatory activity and antipyretic activity.

Many medicaments have hitherto been known as having the analgesic, anti-inflammatory and/or antipyretic activities. We have studied the chemical structures of some of these medicaments which are currently regarded as effective in both pharmacological properties and clinical results, and have induced that a benzothiazolyl acetic acid series which has not been known should be more effective. Thus, several compounds of said series have been chemically synthesized and submitted to pharmacological and clinical tests, whereby 2-substituted-5 or 6-benzothiazolyl acetic acid compounds have been disclosed to be the most effective. Patent applications have already been filed concerning the above novel compounds and the synthesizing processes of the same (cf. Chemical Abstracts, 77, 19634w and 78, 136265h, German Offenlegungschrifts No. 2,145,178 and 2,238,761).

New derivatives of said 2-substituted-5-benzothiazolyl acetic acid, that is, the compounds wherein methyl group is introduced at N-position of the benzothiazole ring thereof have further been disclosed herein to have markedly lower toxicological property and high therapeutic index compared with those of the benzothiazolyl acetic acid compounds previously proposed.

3-Methyl-2-phenyl-5-benzothiazoline acetic acid (R in (I) being hydrogen atom) in the present invention, may be synthesized, for example, by reduction of 5-carboxymethyl-3-methyl-2-phenylbenzothiazolium salt having the structural formula:

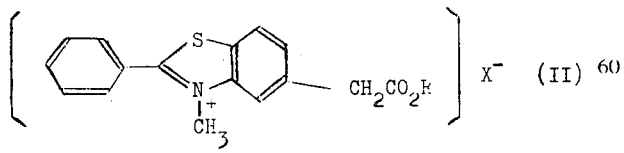

where R is hydrogen atom and X is halogen atom or said residue, in the presence of an organic solvent, which salt compound (in (II), R being hydrogen and X being halogen or acid residue) may be prepared by methylation of 2-phenyl-5-benzothiazolyl acetic acid having the following structural formula:

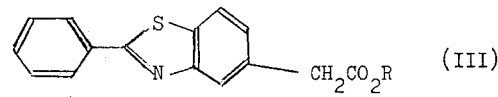

where R is hydrogen atom, in the presence of an organic solvent, if necessary.

The above reducing reaction of the salt compound (in (II), R being hydrogen and X being halogen or acid residue) is carried out at room temperature or at a higher temperature. The methylating reaction of the acid compound (R in (III) being hydrogen) is performed by heating the reaction system under the atmospheric pressure or a higher pressure. As the reducing agent in the above process may be used, for example, a borohydride compound such as sodium borohydride or potassium borohydride, or lithium aluminum hydride. And a methyl halide such as methyl iodide, methyl chloride or methyl bromide, dimethyl sulfate, methyl benzenesulfonate or methyl p-toluenesulfonate, may advantageously be used as the methylating agent in the process. But in case of using any of the above latter three methylating agents, a basic compound such as sodium hydroxide, potassium carbonate, pyridine, or the like, is advantageously added to the reaction system. Further, the examples of the organic solvent employed in the above methylating reaction as well as reducing reaction are ether, dioxane, acetone, tetrahydrofuran and benzene.

Similarly, 3-methyl-2-phenyl-5-benzothiazoline acetic acid methyl ester (R in (I) being methyl group) in the present invention, may be synthesized, for example, by reduction of 5-methoxycarbonylmethyl-3-methyl-2-phenylbenzothiazolium salt (in (II), R being methyl group and X being halogen atom or acid residue), in the presence of an organic solvent, which salt compound (in (II), R being methyl group and X being halogen atom or acid residue) may be prepared by methylation of 2-phenyl-5-benzothiazolyl acetic acid methyl ester (R in (III) being methyl group), in the presence of an organic solvent, if necessary.

The effect of the heating of the reaction system in the reducing reaction and the methylating reaction, the examples of the methylating agent, the reducing agent and the organic solvent employed in the process for producing the methyl ester compound (R in (I) being methyl group), are wholly the same as those in the process for producing the free acid compound (R in (I) being hydrogen atom). However, the above-mentioned salt compound (R in II) being methyl group) may also be prepared by methylation of 2-phenyl-5-benzothiazolyl acetic acid (R in (III) being hydrogen atom) in the methanol solution containing acid such as sulfuric acid, hydrogen chloride, p-toluenesulfonic acid, or the like.

3-Methyl-2-phenyl-5-benzothiazoline acetic acid (R in (I) being hydrogen atom) in the present invention may immediately be esterized to give 3-methyl-2-phenyl-5-benzothiazoline acetic acid methyl ester (R in (I) being methyl group) by heating the same in the presence of methanol containing acid. On the other hand, the above methyl ester compound (R in (I) being methyl group) may be converted into the free acid compound (R in (I) being hydrogen atom) by hydrolyzing the same.

The salts of 3-methyl-2-phenyl-5-benzothiazoline acetic acid (R in (I) being hydrogen) in the present invention represent an additional aspect of the invention. These salts can readily be obtained by reaction of basic compounds on the present benzothiazoline acetic acid (R in (I) being hydrogen) under mild conditions. That is, there may be obtained, for example, salt of an alkali metal such as sodium or potassium, aluminum salt or salt of an alkaline earth metal such as calcium. Similarly, salt of an organic amine such as diethylamine or triethanolamine and salt with an organic acid such as citric acid, lactic acid or the like, may be obtained.

The compounds according to the present invention are all novel substances never before disclosed in the literatures. These compounds have comparatively higher analgesic, anti-inflammatory and antipyretic activities, while showing markedly lower toxicity. Thus, according to a further feature of the invention we provide pharmaceutical compositions comprising at least one compound as defined above in admixture with a physiologically compatible carrier or excipient.

The following Tables 1–6 illustrate the results of toxicological or pharmacological tests of the compounds according to the invention; Table 1 shows acute toxicity using mice (50 % Lethal Dose), Table 2 shows analgesic activity assessed by Koster's method (cf. Fer. Proc 18 (1959), 412), and Table 3 shows analgesic activity assessed by Haffner's method (cf. Deut. Med. Wochochr., 55 (1929), 731). Further, Table 4 shows analgesic effect (50 % Effective Dose) computed by Litchfield-Wilcoxon's method (cf. J. Pharmacel. Exp. Therap., 96 (1949), 99), from the data obtained through Koster's method, Table 5 shows anti-inflammatory activity assessed by Winter's method (cf. Proc. Soc. Exp. Biol. Med.,111 (1962), 544), and Table 6 relates to an antipyretic activity test applying Nakamura's method (Arzneim. Forsch. 20 (1970), 1032).

Explaining additionally the test procedures, the acute toxicity in Table 1 was computed by Litchfield-Wilcoxon's method mentioned in the above, from the data obtained 72 hours after the oral administration of the test compound to ICR mice of ten/group, each mouse weighing 15-20 g. The analgesic activity in Table 2 was represented with inhibition rate for acetic acid-stretching in the procedures of intraperitoneal injection of 0.6 percent acetic acid solution to male ICR mice of five/group, each mouse weighing about 20 g., at the rate of 0.6 mg. of acetic acid per 10 g. of animal weight, as well as the oral administration of the test compound to said mice at the rate of 100 mg. per 1 kg. of animal weight. Further, the analgesic activity in Table 3 was represented with pain-inhibition rate assessed by the pressure threshold one hour after the administration of the test compound to DD mice of ten/-group, each mouse weighing about 25 g, at the rate of 100 mg. per 1 kg. of animal weight.

The 50 percent Effective Dose in Table 4 was calculated from the data measured at 4 time intervals (10–15, 25–30, 40–45 and 55–60 min.), in the same assessing method for analgesic activity as described in Table 2, except employing ten mice instead of five mice per group and administrating 30, 50, 100, 200 and 300 mg of the test compound respectively, instead of 100 mg. thereof only, per 1 kg of animal weight. And the anti-inflammatory activity in Table 5 was calculated from the data obtained 3 hours after the subplantar injection of 0.05 ml. of 1 percent carrageenin solution to male Wister strain rat of five/group, each rate weighing 150–180 g., which injection of the carrageenin solution had been administered an hour after oral administration of the test compound to said rats at the rate of 100 mg. per 1 kg. of animal weight. The antipyretic activity test in Table 6 was executed in such a way as, 15 percent yeast suspension in physiological saline solution was subcutaneouslly injected to male Wister strain rat of five/group, each rat weighing about 200 g., at the rate of 1 ml. per 100 g. of animal weight, and 16 hours thereafter test compound suspended in 0.5 percent CMC solution was orally administered to said rats, wherein the rectal temperatures at respective steps were measured, mark "P" therein showing the level of significance of the peak effect.

In these tests, phenylbutazone, aminopyrine and acetylsalicylic acid, all of which are most current medicaments, were employed as control compounds.

Table 1

| Compound tested | $LD_{50}$(mg./kg.) |
|---|---|
| 3-methyl-2-phenyl-5-benzothiazoline acetic acid | 2900 p.o. |
| 3-methyl-2-phenyl-5-benzothiazoline acetic-acid methyl ester | 3600 p.o. |
| phenylbutazone | 630 p.o. |

Table 2

| Compound tested | Analgesic activity (Koster's method) |
|---|---|
| 3-methyl-2-phenyl-5-benzothiazoline acetic acid | 48.1 % |
| 3-methyl-2-phenyl-5-benzothiazoline acetic-acid methyl ester | 42.6 % |
| phenylbutazone | 41.2 % |

Table 3

| Compound tested | Analgesic activity (Haffner's Method) |
|---|---|
| 3-methyl-2-phenyl-5-benzothiazoline acetic acid | 31.0 % |
| phenylbutazone | 23.5 % |
| aminopyrine | 44.0 % |

Table 4

| Compound tested | $ED_{50}$(mg.kg.)* | |
|---|---|---|
| 3-methyl-2-phenyl-5-benzothiazoline acetic acid | 75.0 | (127.5–44.1) |
| phenylbutazone | 160.0 | (232.0–110.3) |
| aminopyrine | 86.0 | (126.4–58.5) |

*95 % Confidence limits

Table 5

| Compound tested | Anti-inflammatory activity |
|---|---|
| 3-methyl-2-phenyl-5-benzothiazoline acetic acid | 33.7 % |
| 3-methyl-2-phenyl-5-benzothiazoline acetic acid methyl ester | 28.8 % |
| phenylbutazone | 56.0 % |

Table 6

| Compound tested | Dose (mg./kg.) | Rectal temp. (°C) Pre-yeast | Rectal temp. (°C) Post-yeast | Peak effect | Peak time (h) |
|---|---|---|---|---|---|
| Blank | — | 37.2±0.09 | 38.1±0.05 | — | — |
| 3-methyl-2-phenyl-5-benzothiazoline acetic acid | 100 | 37.4±0.09 | 38.0±0.12 | −0.6±0.10* | 2 |
|  | 200 | 37.3±0.10 | 38.0±0.12 | −0.7±0.13* | 2 |
| acetylsalicyclic acid | 200 | 37.3±0.14 | 38.1±0.03 | −0.8±0.09** | 1 |

*P· 0.02
**P· 0.01

The following examples serve to illustrate the invention without limiting it any way:

EXAMPLE 1

A mixture of 2.69 g. (0.01 mole) of 2-phenyl-5-benzothiazolyl aceticacid and 40 g. of methyl iodide is heated in an autoclave at a temperature of about 100 °C for 3 hours. The reaction solution is cooled to crystallize out 5-carboxymethyl-3-methyl-2-phenylbenzothiazolium iodide. The crystals of the iodide compound thus obtained are suspended in a mixture of absolute ether and absolute dioxane, and an excess of sodium borohydride is added little by little to said suspension, while stirring, so as to make the mixture clear, and subsequently the resulting solution is heated at 60 °C for 2 hours. After concentrating the reacted solution an excess of water is added thereto, and precipitated crystals are collected and recrystallized from benzene, the melting point of the refined product being 129°–130 °C. The yield is 1.65 g., corresponding to 57.8 percent of the theoretical amount. The elementary analysis (%) for $C_{16}H_{15}NSO_2$:

Calcd.: C : 67.34; H : 5.30; N : 4.91. Found: C : 67.41; H : 5.38; N : 4.80.

EXAMPLE 2

To a mixture of 2.6 g. (0.01 mole) of 2-phenyl-5-benzothiazolyl acetic acid, 60 ml. of methanol and 25 g. of methyl iodide, are added 2-3 drops of concentrated sulfuric acid, and the mixture is heated in an autoclave at a temperature of about 120 °C for about 3 hours. The reacted solution is cooled to crystallize out 5-methoxycarbonylmethyl-3-methyl-2-phenylbenzothiazolium iodide. The crystals of the iodide compound thus obtained are suspended in 30 ml. of absolute methanol, and an excess of sodium borohydride is added little by little to said suspension, while stirring, so as to make the mixture clear, and thereafter the resulting solution is heated under reflux for about an hour. The reacted solution is concentrated to crystallize out 3-methyl-2-phenyl-5-benzothiazoline acetic acid methyl ester, crystals of which are collected and recrystallized from methanol, the refined product having a melting point of 88°–90°C. The yield is 1.76 g., which corresponds to 58.8 percent of the theoretical amount. The elementary analysis (%) for $C_{17}H_{17}NSO_2$:

Calcd.: C : 68.20; R : 5.72; N : 4.68. Found: C : 68.08; H : 5.81; N : 4.73.

EXAMPLE 3

1.5 g. of potassium hydroxide is dissolved in 50 ml. of methanol, and to this solution is suspended 2.0 g. (0.067 mole) of 3-methyl-2-phenyl-5-benzothiazoline acetic acid methyl ester, followed by heating of the mixture under reflux for about 2 hours. The reacted solution is concentrated, and to this concentrate is added diluted acetic acid to crystallize out 3-methyl-2-phenyl-5-benzothiazoline acetic acid. The crystals are collected and recrystallized from benzene, the refined product having a melting point of 129°–130 °C. The yield is 1.81 g., corresponding to 95 percent of the theoretical amount.

What we claim is:

1. A compound of the formula:

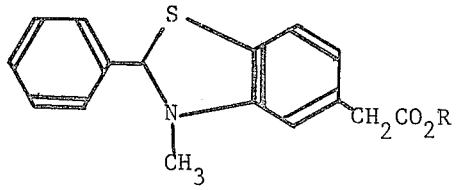

wherein R is a member selected from the group consisting of hydrogen and methyl.

2. Compound according to claim 1, wherein R is hydrogen.

3. Compound according to claim 1, wherein R is methyl.

* * * * *